United States Patent [19]

Kashiwagi

[11] Patent Number: 5,301,262
[45] Date of Patent: Apr. 5, 1994

[54] IMAGE PROCESSOR

[75] Inventor: Hideaki Kashiwagi, Kanagawa, Japan

[73] Assignee: Fuji Xerox Co., Ltd., Tokyo, Japan

[21] Appl. No.: 595,601

[22] Filed: Oct. 10, 1990

[51] Int. Cl.⁵ .............................................. G06K 15/00
[52] U.S. Cl. ..................................... 395/117; 395/116
[58] Field of Search ............... 395/101, 106, 112, 111, 395/116–117; 358/404, 444, 300; 355/308, 309, 313, 323, 314; 346/154

[56] References Cited

U.S. PATENT DOCUMENTS 4,947,345 8/1990 Paradise et al. ...................... 395/112
4,992,882 2/1991 Ikenoue et al. ...................... 358/300

Primary Examiner—Arthur G. Evans
Attorney, Agent, or Firm—Finnegan, Henderson, Farabow, Garrett & Dunner

[57] ABSTRACT

Image data obtained by a image reading unit is stored in a single file of a hard disk on a page basis. An image data control table is held in a main control circuit, and contains job number data and page number data both for inputting and a page number list for ourputting which represents the output order of pages. The image data is read from the hard disk and reproduced by an image output unit according to the order set in the page number list.

12 Claims, 4 Drawing Sheets

FIG. 3(A)
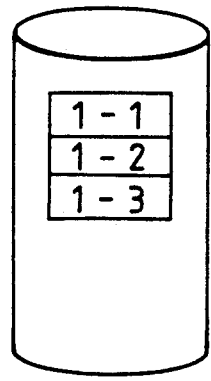
FIG. 3(B)
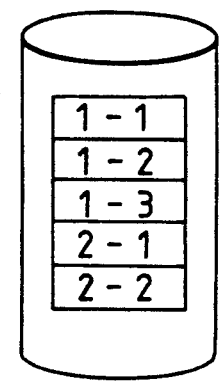
FIG. 3(C)
| 1 - 1 | 1 |
| 1 - 2 | 2 |
| 1 - 3 | 5 |
| 2 - 1 | 3 |
| 2 - 2 | 4 |
20

IMAGE PROCESSOR

BACKGROUND OF THE INVENTION

1. Field of the Invention

This invention relates to processors for electrically processing image data, and more particularly to a processor applied to electrophotographic copying machines with an automatic document handler, which is capable of optionally editing automatically read documents such as merging a page of one document into another document or deleting it.

2. Discussion of the Related Art

Along with increasing speed and quality of copying operations, electrophotographic copying machines have come to be equipped with various functions such as automatic document handling and sorting to further enhance copying efficiency with less involvement of manpower.

When producing a plurality of copies for a single document, a copying machine with a sorter is used to sort the copied documents.

That is, to prepare a plurality of copies of a document with the sorter, the copying machine copies the document in the order of pages as fed for a required number of copies and discharges the copies into the receiving trays. In this case, it is only at the end of copying operation that whether the document has been correctly reproduced can be checked. This entails an enormous amount of time to repair all the copies once errors in selecting a document or in pagination are committed, when a document consisting of a large number of pages is to be copied for a large number of copies.

In a copying machine having a finisher for binding the copies together in addition to the sorter, a mistake in the bound documents also results in disaster in repairing the mistake.

An automatic document handler is employed when copying a large number of pages. The automatic document handler, capable of continuously copying pages by automatically feeding each page to the platen of the electrophotographic copying machine, requires the operator to only set the document on itself to obtain desired copies.

However, there is a shortcoming with the automatic document handler; i.e., not all kinds of document can be handled. Formed of rollers and belts, the automatic document handler can handle only documents in sheet form. Bound documents must be unbound before the handling, and even in sheet form, too thin or thick sheets are not acceptable.

Therefore, to produce a new document out of a combination of a document that is feedable to the automatic document handler (hereinafter referred to as "automatically feedable document") and a document that is not (hereinafter referred to as "manually feedable document"), with the copying machine having the automatic document handler, the copying operation becomes complicated. In such a case, the former document is first automatically copied and then its copies are manually processed to combine with copies of the latter document thereby to obtain a final document, or the automatic copying operation is temporarily interrupted to allow the latter document to be copied; i e., the manually feedable document is set on the platen and copied, and the automatic document handler is re-activated to copy the remaining part of the former document.

As described above, the copying operation with the sorter prevents early detection of errors in, e.g., pagination of the copied documents. On the other hand, the copying operation without the sorter but with the automatic document handler allows such errors to be checked at a stage as early as the completion of the first set of copies, but may damage the document by feeding it to the platen many times, thereby making the automatic document handler unsuitable for processing important documents.

The above circumstances are not easily rectifiable in light of the fact that the prior art electrophotographic copying machines focus light reflected from the irradiated image of a document by a lens to imagewise expose a photoreceptor and thus the input of the image and the exposure of the photoreceptor are performed simultaneously.

To overcome the above circumstances, a copying machine in which image data input from an image input unit is electronically processed and stored has come to be used.

Such a copying machine with an image data storing unit stores image data while reading the document only once using the automatic document handler and reads the stored image data from the storing unit for its output of a desired number of copies. Thus, by reading the document only once, the feature of electronically processing the image data with this machine can perform the same operation of reading the document by repeatedly feeding it to the platen with the automatic document handler.

FIG. 5 shows an exemplary digital copying machine having a mechanism for electronically processing image data.

In the digital copying machine, image input terminal (IIT) 30 reads a document using, e.g., a CCD (charge coupled device) image sensor; the resulting analog video signals are converted to digital signals; the digital signals are corrected and converted to binary data by image processing system (IPS) 31; and the binary data are stored in storing unit 32.

In image output terminal (IOT) 33, the stored data is output imagewise on the photoreceptor by controlling a light source such as a laser on and off to form pixels as specified by the binary data, thereby to reproduce the image of the document into a copy.

However, even the copying machine with a storing unit for electronically storing image data must temporarily be interrupted when a manually feedable document is to be copied. That is, the machine must stop the automatic document handling operation at the position where the manually feedable document is to be fed and placed on the platen of the machine to cause the machine to read it, and thereafter, the machine must resume the processing in the automatic document handling mode.

In a copying machine with a finisher, the operation of the finisher is activated by detecting a stop signal of the reading unit of the machine. Therefore, interruption of the automatic document handling operation, erroneously regarded as a regular end of the document, causes the finisher to start operating. Thus, it is, in fact, impossible to use the finisher in the prior art copying machines.

SUMMARY OF THE INVENTION

The present invention has been made in view of the above circumstances and has an object of providing an improved image processor capable of optionally editing a document such as merging or deleting pages.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the image processor of this invention basically comprises means for compressing image data, means for storing the image data compressed by the compressing means, means for expanding the compressed image data into the original image data, and means for controlling each of the above means; and compresses and stores the image data from an image input unit, reads and expands the stored data, and outputs the expanded image data to an image output unit. The control means includes a memory for storing data to control on a page basis the image data stored in the storing means so that the image data stored in the storing means can be edited in a desired order of pages.

The image processor according to the present invention compresses image data of both an automatically read document and a manually read document by a compressor, stores the compressed image data in a storing unit on a page basis, and controls the stored data on a page basis by a memory made of a RAM (random access memory) arranged in a control unit to allow such operations as merge, move, delete of data to be performed to any desired page. When a manually feedable document must be merged into an automatically feedable document, the former can be inserted into any desired position by an editing operation, after reading the former placed on a platen before or after reading the whole of the latter, thereby streamlining the copying operation.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIGS. 3(A) and 3(B) are examples of an array of pages within the hard disk;

FIG. 3(C) is an example of a page number list in the control circuit;

DETAILED DESCRIPTION OF THE PREFERRED EMBODIMENTS

The present invention will be described with reference to the accompanying drawings.

Figure 1:
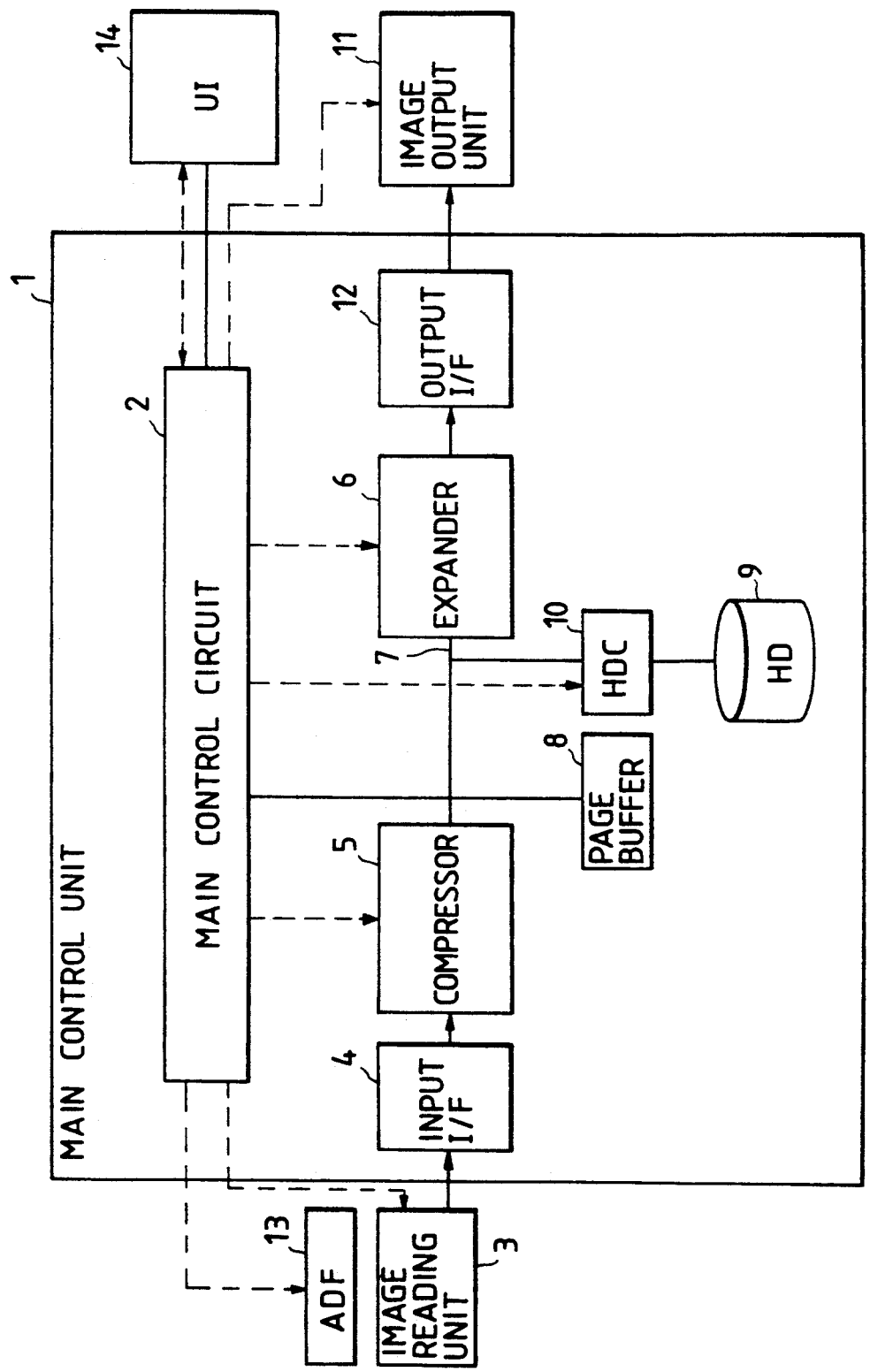
FIG. 1 is a diagram showing an image processor that is an embodiment of the present invention.

FIG. 1 is a diagram showing an image processor which is an embodiment of the present invention.

Referring to FIG. 1, main control unit 1 comprises: main control circuit 2 for controlling various parts of the image processor and performing inter-page editing; input interface 4 for receiving the image data produced by image reading unit 3; compressor 5 for compressing the image data; expander 6 for expanding the compressed image data to recover the original image data; image bus 7 for transferring the image data; page buffer 8 for temporarily storing the image data before storing it in hard disk 9; hard disk 9 for storing a large volume of data; hard disk controller (HDC) 10 for controlling hard disk 9; and output interface 12 for outputting the image data to image output unit 11.

Image reading unit 3 is, e.g., an image scanner using a CCD sensor, and subjects the resulting image data signals to offset and gain adjustments, converts the analog image data to digital image data, and subjects the digital image data to gap and shading corrections, etc. In case of color processing, the image reading unit 3 produces color-separated image data of three primary colors, R (red), G (green), and B (blue), and subjects such image data to equivalent neutral density conversion, color masking, document size detection, color conversion, undercolor removal and black generation, mesh point removal and edge enhancement, tone correction control, reduction/enlargement, editing, and the like Image reading unit 3 is equipped with automatic document handler (ADF) 13.

Image output unit 11 is, e.g., a laser printer capable of reproducing a half tone image consisting of mesh points by switching a laser beam on and off on a pixel basis based on binary data generated from the image data.

User interface (UI) 14 comprises a display unit such as a cathode-ray tube (CRT) or a liquid crystal display, a control panel, etc., and is used to set/input various functions and editing operations of a copier and to display the states of those.

Compressor 5 compresses the image data so that an enormous amount of data can be efficiently stored in a limited capacity of hard disk 9. Various algorithms may be used to compress image data. For example, an adaptive prediction encoding system, featuring the constant compressing speed with any image data, is preferable because it contributes to making the machine simpler.

The adaptive prediction encoding system performs simultaneous prediction of image data, e.g., every 8 pixels with a plurality of predictors and applies the predictor scoring the highest rate of correct prediction to the prediction of next 8 pixels. In this case, the data is compressed by replacing the pixel signal for which the prediction was correct with "0" and that for which the prediction was incorrect with "1."

Expander 6 expands the compressed data to obtain the original image data to be applied to image output unit 11.

Page buffer 8 is constituted by a high-speed semiconductor memory capable of storing data equivalent to at least one page of document and is used to temporarily store the data when the data is being written to or read from hard disk 9. Page buffer 8 is also available as a storing unit when the volume of data is too small to be stored in hard disk 9.

Hard disk 9 is a large-capacity storage of several tens to several hundreds of megabytes for storing a large volume of data. Hard disk controller 10 controls writing and reading of a large volume of data to and from hard disk 9.

Figure 2:
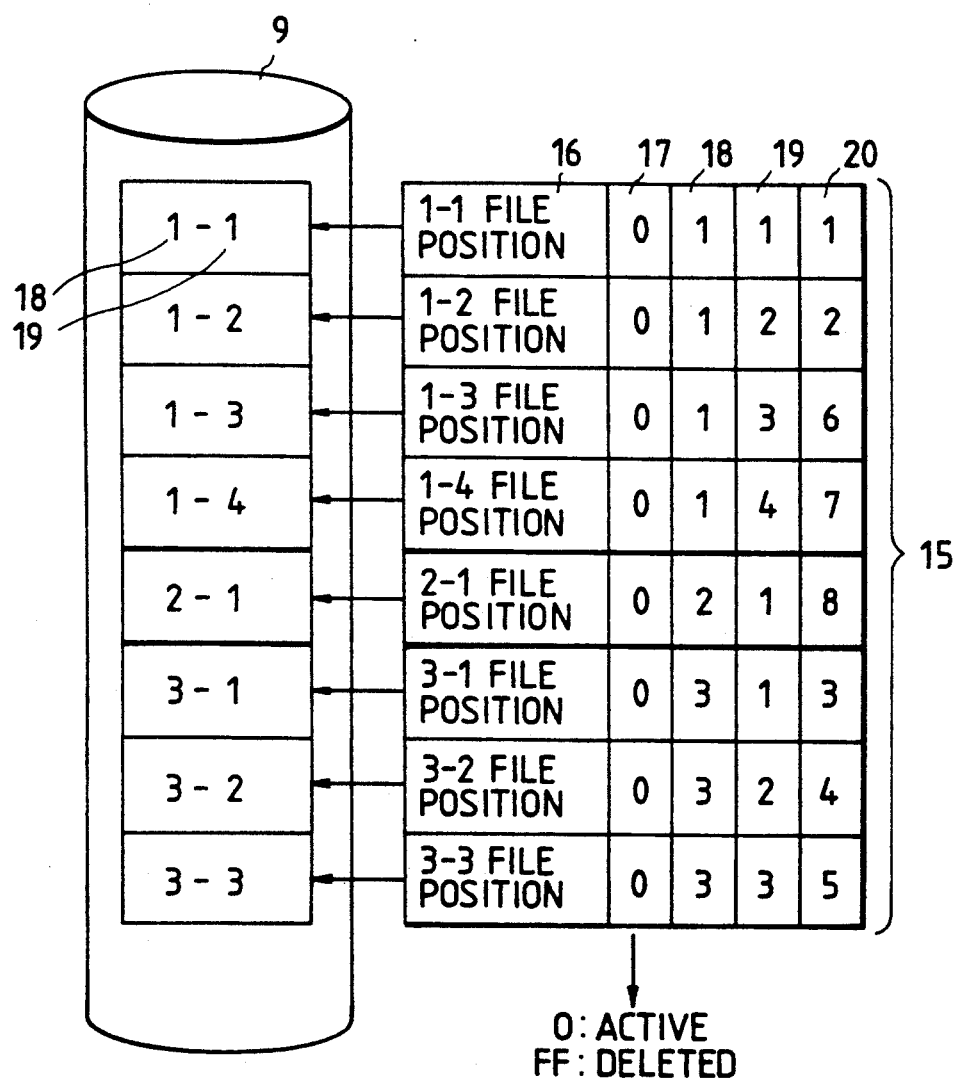
FIG. 2 is a diagram showing the storing condition of data in a hard disk and image data control table held in a control circuit for controlling the data.

FIG. 2 is a diagram showing the storing condition of data in hard disk 9 and image data control table 15 held in main control circuit 2 which is used to manage the data stored in hard disk 9. Each data stored in hard disk 9 is assigned a tag consisting of a job number and a page number, such as 1-1, 1-2, 2-1, 3-1, and 3-2. The first numeral designates a job number and the latter, a page number.

The image data in hard disk 9 are stored in a single file and managed on a page basis. The data of a following page is to be appended to the same file as the first page data. Thus, such an arrangement that successive data is appended to the single file for controlling all document data without preparing a plurality of files allows an editing job to be performed without going through the process of combining the files, etc., thereby facilitating the processing.

Image data control table 15 in a memory arranged in main control circuit 2 contains address data 16 in hard disk 9, job data 17, and job number data 18 of the image data per page, page number data 19 for inputting, and page number list 20 for controlling the order of reading from hard disk 9 in the image output operation.

Since image data control table 15 has address data 16 of image data in hard disk 9, an editing job can be performed without relocating the image data in hard disk 9. Further, job data 17 in image data control table 15 enables each page to be processed independently.

Further, the data at the time of imputting, such as the image input order, is contained as job number data 18 and input page number 19, and this enables the image data to be re-input at any stage of the processing.

Still further, in addition to a job of pagination change, it is possible to output a document without certain pages by using UI 14 in such a way that a page deletion mode is selected and predetermined pages are deleted from page number list 20.

Even after the pages have been deleted, job number data 18 and page number data 19 of the deleted pages at the time of their input still remain valid, so that it is possible to reproduce a document including the deleted pages by registering again the deleted pages in the page number list, thereby allowing form of the output document to be diversified.

By providing data representing a blank page in page number list 20, a blank page can be inserted to a document.

A case will now be described in which a document consisting of two manually feedable thick-sheet pages is inserted, as the third and fourth pages, into another document consisting of three automatically feedable pages.

The copying machine, set to a nonprint mode, reads all the pages of the automatically feedable document using automatic document handler 13. Then, the resulting image data is applied to main control unit 1 through input interface 4, compressed by compressor 5, and stored in hard disk 9 through image bus 7 using page buffer 8.

FIGS. 3(A) and 3(B) show the image data in hard disk 9 arranged on a page basis. As shown in FIG. 3(A), the automatically feedable document whose job number is 1 is stored with tags 1-1, 1-2, and 1-3, the first numeral of which designates a job number and the latter, a page number.

Then, the manually feedable document is placed on the platen. When it has been read, the image data is compressed by compressor 5, applied to hard disk 9, has its tags 2-1 and 2-2 appended, and added to the initial file as shown in FIG. 3(B) in the same manner as in the automatic reading.

As a result, hard disk 9 contains both image data of the automatically read document and that of the manually read document.

To output the image data stored in hard disk 9 in the stored order, a printing instruction is given directly from UI 14. To output the image data in a different order, however, an inter-page edit mode must be selected from UI 14 so that page number list 20 stored in the memory arranged in main control circuit 2 can be modified to 1-1, 1-2, 2-1, 2-2, 1-3 as shown in FIG. 3(C).

Upon instruction to print, the image data is read from hard disk 9 in the order of pages as designated by page number list 20, expanded by expander 6 into the original image data, and applied to image output unit 11 through output interface 12 to produce a predetermined set of copies.

Figure 4:
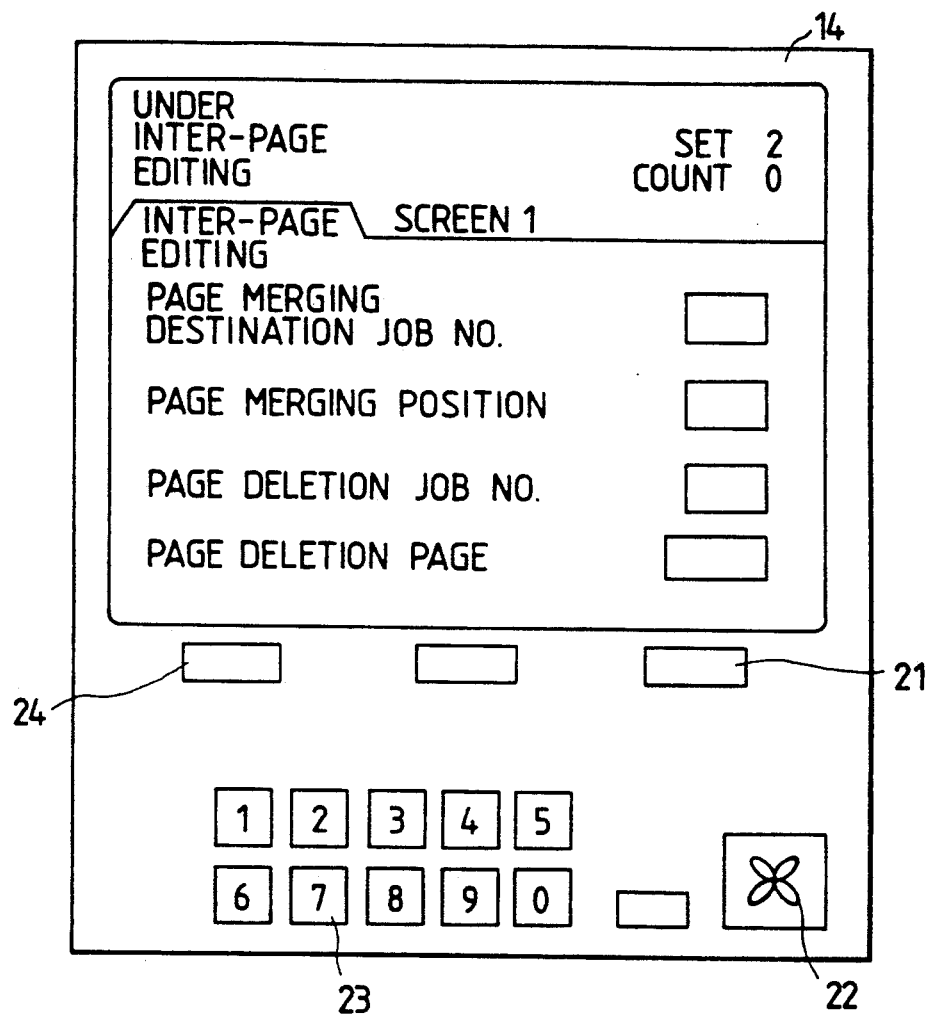
FIG. 4 is a diagram depicting an exemplary user interface.
Figure 5:
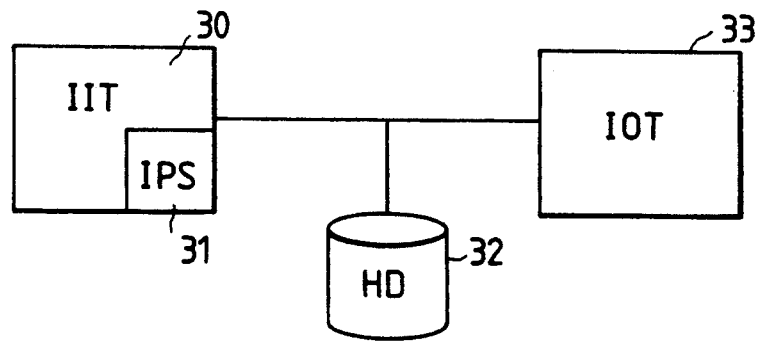
FIG. 5 is a diagram showing an exemplary digital copying machine having a mechanism for electronically processing image data.

Referring to FIG. 4, there is shown an example of UI 14, which comprises: print mode selection button 21 for selecting the print mode in which the input image data is directly output or the nonprint mode in which the input image data is only stored; start button 22 for instructing to start operating the machine; ten-key pad 23 from which to enter data such as the number of printing copies (sets) and a page number; and inter-page edit mode button 24. The screen in the figure shows an inter-page editing.

The image data is output in a predetermined order of pages, and therefore the output pages can be bound by a finisher.

To output a plurality of sets of copies, an instruction may be issued from UI 14 to output only one set of the document Upon confirmation that the obtained copies are as desired, the rest of the copies (sets) may then be output.

Unless instructed to output only the first set of a plurality of sets of copies or to use the image data, undesired mixture of image data due to failure to delete the stored data can be prevented by the feature of automatically erasing the image data stored in hard disk 9 and the data contained in image data control table 15 upon end of the image output.

When it is selected to first output only one set among a plurality of sets of copies, the image data stored in hard disk 9 and the data contained in image data control table 15 are likewise automatically erased upon instruction to output the rest of the copies.

To output the initially input image data in various modes, the image processor may be constructed so that it is not permitted to issue an instruction to output the image data unless selection has been made to erase or not the image data stored in hard disk 9 and the data contained in image data control table 15. As a result, undesired mixture of the image data due to failure to erase the data can be prevented in case of performing such a special processing.

As is apparent from the foregoing description, the image data input by a series of input operations are stored in the hard disk in the form of a single file and managed on a page basis by the image data control table in the memory of the control circuit, thereby allowing page-rearrangement of documents, such as moving pages to desired positions, to be optionally performed. This is particularly advantageous when having to reproduce images of heterogeneous sources, e.g., automatically feedable documents and manually feedable thin- or thick-sheet documents, as paginated, and to bind the copies by the finisher, thereby contributing to saving manpower in copying.

The foregoing description of preferred embodiments of the invention has been presented for purposes of illustration and description. It is not intended to be exhaustive or to limit the invention to the precise from disclosed, and the modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It s intended that the scope of the invention be defined by the claims appended hereto, and their equivalents.

What is claimed is:

1. An image processor comprising:
    means for reading an image on a document to produce image data thereof:
    means for storing on a page basis the image data provided from the image reading means;
    means for setting an output page order of the image data read from the image storing means;
    means for outputting the image data read from the image storing means as a hard copy of the document; and
    means for controlling the image storing means and the image output means so that the image data is output from the image storing means on a page basis according to the output page order and the hard copy is output from the image output means according to the output page order.

2. An image processor having means for reading an image on a document to produce image data thereof, means for storing the image data provided from the image reading means, and means for outputting the image data read from the image storing means as a hard copy of the document, said image processor comprising:
    means for setting managing data including an output page order to manage on a page basis the image data read by the image reading means; and
    means for controlling the storing means and the image output means so that the image data is output from the storing means on a page basis according to the managing data and the hard copy is output from the image output means according to the output page order.

3. The image processor according to claim 2, wherein the managing data comprises first data for reading which includes job number data and page number data subordinate to the job number data, and second data for outputting which includes the output page order.

4. An image processor having means for reading an image of a document to produce image data thereof, means for storing the image data provided from the image reading means, and means for outputting the image data read from the storing means as a hard copy of the document, said image processor comprising:
    means for setting, in association with the image data, managing data comprising first data for reading which includes job number data and page number data subordinate to the job number data, and second data for outputting which includes an output page order;
    means for altering the output page order of the managing data held in the managing data setting means; and
    means for controlling the storing means and the image output means so that the image data is read from the storing means on a page basis according to the managing data and the hard copy is output from the image output means according to the output page order.

5. The image processor according to claim 4, wherein the first data for reading among the managing data cannot be deleted by the altering means.

6. The image processor according to claim 4, wherein all the image data are stored in the same file of the storing means.

7. The image processor according to claim 4, wherein the altering means can alter the output page order so that an editing operation including optional page moving, page deletion and white page insertion can be performed.

8. The image processor according to claim 4, wherein the image data stored in the storing means are erased upon completion of an image output operation of the image output means.

9. The image processor according to claim 4, wherein when a plurality of copy sets of the document are to be output, the control means operates so as to set a predetermined time interval between outputting of a first set of copies and that of sebsequent sets of copies.

10. An image processor having means for reading an image of a document to produce image data, means for compressing the image data read by the image reading means, means for storing the compressed image data, means for expanding the compressed image data, and means for outputting the expanded image data as a hard copy of the document, said image processor comprising:
    means for setting, in association with the image data, managing data comprising first data for reading which includes job number data and page number data subordinate to the job number data, and second data for outputting which includes an output page order;
    means for altering the output page order of the managing data held in the managing data setting means; and
    means for controlling the storing means and the image output means so that the image data is read from the storing means on a page basis according to the managing data and the hard copy is output from the image output means according to the output page order.

11. An image processor capable of handling automatically feedable documents and manually feedable documents, comprising:
    means for reading page image data from automatically feedable and manually feedable documents;
    means for storing on a page basis the page image data for each document read by the image reading means;
    means for setting an output page order of the page image data stored in the storage means;
    means for outputting the page image data read from the image storing means according to the output page order as selected by the setting means; and
    means for printing the output page image data on a page basis according to the output page order as selected by the setting means.

12. The image processor of claim 11, including means for erasing the page image data from the storage means after the page image data has been output by the outputting means.

* * * * *

UNITED STATES PATENT AND TRADEMARK OFFICE
CERTIFICATE OF CORRECTION

PATENT NO. : 5,301,262
DATED : April 5, 1994
INVENTOR(S) : Hideaki Kashiwagi

It is certified that error appears in the above-indentified patent and that said Letters Patent is hereby corrected as shown below:

1st line of the Abstract: "a image" should read --an image--.

5th line of the Abstract; "ourputting" should read --outputting--.

Claim 9, Column 8, Line 26 "sebsequent" should read --subsequent--.

Signed and Sealed this

Tenth Day of January, 1995

*Attest:*

BRUCE LEHMAN

*Attesting Officer*     *Commissioner of Patents and Trademarks*